United States Patent
Van Rossum et al.

(10) Patent No.: US 9,946,500 B2
(45) Date of Patent: Apr. 17, 2018

(54) METHOD FOR TWO-SIDED PRINTING OF DIGITAL IMAGES FROM A ROLL IN A ROLL-TO-ROLL PRINTING SYSTEM

(71) Applicant: Océ Holding B.V., Venlo (NL)

(72) Inventors: Elsemieke P. A. Van Rossum, Venlo (NL); Eduardus J. W. Van Vliembergen, Venlo (NL)

(73) Assignee: OCE HOLDING B.V., Venlo (NL)

( * ) Notice: Subject to any disclaimer, the term of this patent is extended or adjusted under 35 U.S.C. 154(b) by 0 days.

(21) Appl. No.: 15/453,425

(22) Filed: Mar. 8, 2017

(65) Prior Publication Data
US 2017/0277492 A1    Sep. 28, 2017

(30) Foreign Application Priority Data

Mar. 22, 2016   (EP) .................................... 16161710

(51) Int. Cl.
*G06F 15/00* (2006.01)
*G06F 3/12* (2006.01)

(52) U.S. Cl.
CPC ............ *G06F 3/1254* (2013.01); *G06F 3/126* (2013.01); *G06F 3/1208* (2013.01);
(Continued)

(58) Field of Classification Search
CPC ...... G06F 3/1254; G06F 3/1208; G06F 3/126; G06F 3/1256; G06F 3/1258; G06F 3/1251
(Continued)

(56) References Cited

U.S. PATENT DOCUMENTS

2012/0081426 A1   4/2012  Rossell et al.
2013/0301061 A1*  11/2013  Conlon ................ G06F 3/1208
                                                            358/1.2

FOREIGN PATENT DOCUMENTS

EP         2 371 562 A2    10/2011

* cited by examiner

*Primary Examiner* — Saeid Ebrahimi Dehkord
(74) *Attorney, Agent, or Firm* — Birch, Stewart, Kolasch & Birch, LLP

(57) ABSTRACT

A method for two-sided printing of digital images on a roll of media by means of a roll-to-roll system is provided. The roll-to-roll system includes a digital image queue including entries for digital images to be printed on the roll. For each digital image to be printed on a first side of the roll, a first entry is registered in the digital image queue, which entry includes at least one digital item identifying the digital image and digital items of print properties of the digital image. For each digital image to be printed on a second side of the roll, a second entry is registered in the digital image queue, which entry includes at least one digital item identifying the digital image and digital items of print properties of the digital image. For each first digital image to be printed on the first side of the roll, a first location on the first side of the roll is established at which first location the first digital image is intended to be printed, a second digital image is established which is intended to be printed at a second location on the second side of the roll, the second location being the backside of the first location. The first entry of the first digital image in the digital image queue is then linked to the second entry of the second digital image in the digital image queue by means of a linking digital item in the digital image queue. The first digital images are printed on the first side of the roll according to the digital image queue, the one-sided printed roll is received in the input holder, and the second digital images are printed on the
(Continued)

second side of the roll according to the corresponding linking digital items in the digital image queue.

14 Claims, 17 Drawing Sheets

(52) U.S. Cl.
CPC .......... *G06F 3/1251* (2013.01); *G06F 3/1256* (2013.01); *G06F 3/1258* (2013.01)

(58) Field of Classification Search
USPC ....................................................... 358/1.18
See application file for complete search history.

| Input roll | Print on | Digital Image | No of copies | Output roll | Linked Image |
|---|---|---|---|---|---|
| 1 | 1st side | Image 1a1 | 100 | 1 | Image 1a2 |
| 1 | 1st side | Image 1b1 | 42 | 1 | Image 1b2 |
| 1 | 1st side | Image 1c1 | 60 | 1 | Image 1c2 |
| 1 | 1st side | Image 1d1 | 80 | 1 | Image 1d2 |
| 2 | 1st side | Image 2a | 60 | 2 | |
| 2 | 1st side | Image 2b | 200 | 2 | |
| 2 | 1st side | Image 2c | 300 | 2 | |
| 1 | 2nd side | Image 1d2 | 80 | 1 | Image 1d1 |
| 1 | 2nd side | Image 1c2 | 60 | 1 | Image 1c1 |
| 1 | 2nd side | Image 1b2 | 42 | 1 | Image 1b1 |
| 1 | 2nd side | Image 1a2 | 100 | 1 | Image 1a1 |

| Input roll | Print on | Digital Image | No of copies | Output roll | Linked Image |
|---|---|---|---|---|---|
| 1 | 1st side | Image 1a1 | 100 | 1 | Image 1a2 |
| 1 | 1st side | Image 1c1 | 80 | 1 | Image 1c2 |
| 1 | 1st side | Image 1b1 | 42 | 1 | Image 1b2 |
| 1 | 1st side | Image 1d1 | 80 | 1 | Image 1d2 |
| 2 | 1st side | Image 2a | 60 | 2 | |
| 2 | 1st side | Image 2b | 200 | 2 | |
| 2 | 1st side | Image 2c | 300 | 2 | |
| 1 | 2nd side | Image 1d2 | 80 | 1 | Image 1d1 |
| 1 | 2nd side | Image 1b2 | 42 | 1 | Image 1b1 |
| 1 | 2nd side | Image 1c2 | 80 | 1 | Image 1c1 |
| 1 | 2nd side | Image 1a2 | 100 | 1 | Image 1a1 |

METHOD FOR TWO-SIDED PRINTING OF DIGITAL IMAGES FROM A ROLL IN A ROLL-TO-ROLL PRINTING SYSTEM

FIELD OF THE INVENTION

The present invention relates to a method for two-sided printing of digital images on a roll of media by means of a roll-to-roll system, the roll-to-roll system comprising a digital image queue comprising entries for digital images to be printed on the roll, the method comprising the steps of for each digital image to be printed on a first side of the roll registering a first entry in the digital image queue which entry comprises at least one digital item identifying the digital image and digital items of print properties of the digital image, for each digital image to be printed on a second side of the roll registering a second entry in the digital image queue which entry comprises at least one digital item identifying the digital image and digital items of print properties of the digital image, printing the first digital images on the first side of the roll according to the digital image queue, receiving the one-sided printed roll in the input holder, and printing the second digital images on the second side of the roll.

The present invention also relates to a roll-to-roll printing system which is configured to execute a method according to the invention.

BACKGROUND OF THE INVENTION

Nowadays roll-to-roll printing systems are available for printing digital images according to a digital image queue. The digital image queue has an entry for each submitted digital image to be printed. The sequence order of the entries in the digital image queue represents a chronological order of printing the corresponding digital images on the roll. Such an entry comprises a digital identification to the digital image —for example a link to the storage location of the digital image—, image properties of the digital image, etc. A user is able to move entries up and down the digital image queue, for example to move an entry to the head of the digital image queue.

Roll-to-roll systems have at least one input holder for holding input rolls and at least one output holder for holding output rolls. In a roll-to-roll printing system in general two-sided printing is realized by loading a roll in the input holder, printing the digital images intended to be printed on the first side of the roll, winding up the roll on the output holder, unloading the printed roll from the output holder, reloading the printed roll in the input holder, printing the digital images intended to be printed on the second side of the—one-sided printed—roll and winding up the two-sided printed roll on the output holder. A calibration step for positioning the first side of the roll before printing and a calibration step for positioning the second side of the roll before printing is known in the art. Between the printing of the first side of the roll and printing of the second side of the roll other rolls may be printed by the roll-to-roll printing system.

In case of two-sided printing a digital image to be printed on a first location on the first side of the roll such that a digital image to be printed on a second location of the second side of the roll, the second location being the backside of the first location, is predetermined by the scheduling of the operator or by the specifications of the print jobs which have been submitted to the roll-to-roll printing system and include the digital images to be printed.

However, when scheduling the digital images on the first side of the roll and the second side of the roll the operator wants to keep a freedom of moving entries of digital images intended to be printed on the first side and/or on the second side of the roll in the digital image queue to another position in the digital image queue in case of two-sided printing on the roll.

The objective of the present invention is to influence an order of printing digital images on a roll which is intended to be two-sided printed.

The objective is achieved by the method according to the present invention wherein the method comprises the steps of for each first digital image to be printed on the first side of the roll, establishing a first location on the first side of the roll at which first location the first digital image is intended to be printed, establishing a second digital image which is intended to be printed at a second location on the second side of the roll, the second location being the backside of the first location, and linking the first entry of the first digital image in the digital image queue to the second entry of the second digital image in the digital image queue by means of a linking digital item in the digital image queue, and printing the second digital images on the second side of the roll according to the corresponding linking digital items in the digital image queue, wherein the method comprises the steps of, upon changing a position of the first linked entry in the digital image queue into a new first position, changing a position of the second linked entry in the digital image queue such that the digital image corresponding to the second linked entry at the changed position is intended to be printed on a backside of the digital image corresponding to the first linked entry at the new first position, and, upon changing a position of the second linked entry in the digital image queue into a new second position, changing a position of the first linked entry in the digital image queue such that the digital image corresponding to the first linked entry at the changed position is intended to be printed on a backside of the digital image corresponding to the second linked entry at the new second position.

By doing so, the digital images intended to be printed on the first side of the roll and on the second side of the roll are linked. A second digital image corresponds via a linked entry to a first digital image. The second digital image is then printed on the backside of the first printed digital image. The second digital image may be the same as the first digital image. The second digital image may be different from the first digital image. The second digital image may be a mirrored image of the first digital image.

For convenience reasons, hereinafter a first digital image corresponding to a first entry which is linked to a second entry comprising a representation of a second digital image, is said to be linked to the second digital image.

Upon changing a position of the first linked entry in the digital image queue into a new first position, a position of the second linked entry in the digital image queue is changed such that the digital image corresponding to the second linked entry at the changed position is intended to be printed on the backside of the digital image corresponding to the first linked entry at the new first position.

For example, moving a digital image intended to be printed on a location on the first side one position up in the digital image queue results in moving the corresponding digital image intended to be printed on the backside of the location one position down in the digital image queue. The latter movement is opposite to the first movement since, when the roll is one-sided printed, the printing on the second side of the roll starts at the end of the wound up one-sided printed roll.

Mutatis mutandis, upon changing a position of the second linked entry in the digital image queue into a new second position, a position of the first linked entry in the digital image queue is changed such that the digital image corresponding to the first linked entry at the changed position is intended to be printed on the backside of the digital image corresponding to the second linked entry at the new second position.

For example, moving a digital image intended to be printed on a location on the second side one position up in the digital image queue results in moving the corresponding digital image intended to be printed on the backside of the location one position down in the digital image queue. The latter movement is opposite to the first movement since, when the roll is one-sided printed, the printing on the second side of the roll starts at the end of the wound up one-sided printed roll.

According to an embodiment the method comprises a step of, upon changing a value of a digital item of a print property of the first linked entry into a new first value, changing a value of a corresponding digital item of a print property of the second linked entry into the same new first value.

For example, the print property is a number of copies of a first digital image corresponding to the first linked entry. When the number of copies of the first digital image is changed a number of copies of the corresponding second digital image is changed accordingly.

For example, a left margin for a first digital image is taken into account when printing a corresponding second digital image on the second side of the roll. A left margin of the second digital image is made equal to the left margin of the first digital image and the second digital image is rotated π radians before printing the second digital image on the second side of the roll. A right margin for a first digital image is taken into account when printing a corresponding second digital image on the second side of the roll. A right margin of the second digital image is made equal to the right margin of the first digital image and the second digital image is rotated π radians before printing the second digital image on the second side of the roll.

For example, a top margin for a first digital image is taken into account when printing a corresponding second digital image on the second side of the roll. A bottom margin of the second digital image is made equal to the top margin of the first digital image and the second digital image is rotated π radians before printing the second digital image on the second side of the roll. A bottom margin for a first digital image is taken into account when printing a corresponding second digital image on the second side of the roll. A top margin of the second digital image is made equal to the bottom margin of the first digital image and the second digital image is rotated π radians before printing the second digital image on the second side of the roll.

According to an embodiment the method comprises the step of, upon changing a value of a digital item of a print property of the second linked entry into a new second value, changing a value of a corresponding digital item of a print property of the first linked entry into the same new second value.

The print property is at least one out of a number of copies, a left margin to be taken into account when printing on the roll, a right margin to be taken into account when printing on the roll, a top margin to be taken into account when printing on the roll, and a bottom margin to be taken into account when printing on the roll.

According to an embodiment the step of printing the second digital images on the second side of the roll according to the corresponding linking digital items in the digital image queue comprises the step of centring the second digital images on the second side of the roll to the centre of the printed corresponding first digital images on the first side of the roll. By centring the second digital image at the centre of the first digital image on the other side of the roll, the printed first digital image maximally overlaps with the printed second digital image to be printed on the back side of the printed first digital image. The centring step is also applicable if the size of the first digital image deviates from the size of the second digital image.

According to an embodiment the step of changing a position of the first linked entry into another position in the digital image queue comprises the sub-steps of displaying a user operable representation of the digital image queue on a user interface screen of the roll-to-roll printing system, the user operable representation having a digital image part for an entry of a digital image intended to be printed on the roll, moving the digital image part corresponding with the first linked entry to a position in the user interface screen corresponding to the other position, and automatically moving the digital image part corresponding with the second linked entry to a corresponding position in the user interface screen.

The user interface screen of the roll-to-roll printing system for input of operator actions or displaying the status of the roll-to-roll printing system according to the digital image queue may be a local user interface connected to the roll-to-roll printing system or a remote user interface wireless connected to the roll-to-roll printing system, like a mobile device, a tablet, a mobile phone, a smart phone, a smart watch, smart glasses, a notebook computer, a laptop computer or any other hand held device. The user interface may also be a part of a desktop computer connected to the roll-to-roll printing system via a network system.

According to an embodiment the step of changing a position of the second linked entry into another position in the digital image queue comprises the sub-steps of displaying a user operable representation of the digital image queue on a user interface of the roll-to-roll printing system, the user operable representation having a digital image part for an entry of a digital image intended to be printed on the roll, moving the digital image part corresponding with the second linked entry to a position in the user interface screen corresponding to the other position, and automatically moving the digital image part corresponding with the first linked entry to a corresponding position in the user interface screen.

According to an embodiment the step of linking the first entry of the first digital image in the digital image queue to the second entry of the second digital image in the digital image queue, comprises the step of making a digital image part of the user operable representation of the digital image queue on a user interface screen of the roll-to-roll printing system inoperable for a user, the digital image part corresponding to the second entry in the digital image queue.

The second digital image to be printed on the backside of the particular digital image is prohibited to be operated upon in the digital image queue in order to respect the linking between the first digital image and the second digital image.

For example the entry of the second digital image is prohibited to be moved to another location in the digital image queue or the number of copies of the second digital image may not be changed in order to respect the linking between the first digital image and the second digital image.

According to an embodiment the method comprises the step of, after printing the first digital image of the first entry in the digital image queue which first entry is linked to the second entry of the second digital image in the digital image queue, making a digital image part of the user operable representation of the digital image queue on a user interface screen of the roll-to-roll printing system inoperable for a user, the digital image part corresponding to the second entry in the digital image queue.

Since the first digital image corresponding to the first entry is already printed on a location on the first side of the roll, the second digital image to be printed on the backside of the first digital image is prohibited to be operated upon in the digital image queue in order to respect the linking between the first digital image and the second digital image on the roll.

For example the entry of the second digital image is prohibited to be moved to another location in the digital image queue or the number of copies of the second digital image is prohibited to be changed in order to respect the linking between the first digital image and the second digital image on the roll.

The inoperable digital image part of the representation of the digital image queue may be expressed by a deviating color of the digital image part, for example a grey color.

According to an embodiment the method comprises the steps of changing a roll property of the roll by means of the user interface screen and changing the corresponding digital items of print properties of the linked entries corresponding to digital images to be printed on the both sides of the roll. A roll property may be a roll width, a media type of the roll, a media weight of the roll, any other media property of the roll, etc.

According to an embodiment a first digital item representing the first side of the roll on the user interface screen and a second digital item representing the second side of the roll on the user interface screen may be provided. The first digital item and/or the second digital item may be provided with indications of roll properties of the corresponding roll. The indications of roll properties may be editable. If a roll property of the first digital item representing the first side of the roll is changed, automatically a same or corresponding property of the second digital item representing the second side of the roll is changed.

An example of a corresponding property of the second side of the roll may be an indication if the second side is coated or uncoated. When using one-sided coated media a media property of the first side may be labelled "uncoated" while the corresponding media property of the second side may be labelled "coated".

According to an embodiment at least one of the first digital item and the second digital item is provided with a swap operable digital item. Upon activating the swap operable digital item by the user by means of a finger touch, mouse click, etc, digital images shown on the user interface screen to be printed on the first side of the roll are automatically swapped with digital images shown on the user interface screen to be printed on the second side of the roll. The corresponding entries in the digital image queue are simultaneously and automatically swapped.

According to an embodiment the method comprises the steps of displaying a user operable digital pool item on the user interface, the user operable digital pool item comprising a representation of a two-sided digital image to be printed, dragging the representation to the first digital item or to the second digital item, displaying one digital image of the two-sided digital image at the first digital item, displaying the other digital image of the two-sided digital image at the second digital item, creating a first entry of the one digital image in the digital image queue to be printed on the first side of the roll, creating a second entry of the other digital image in the digital image queue to be printed on the second side of the roll, and linking the first created entry with the second created entry.

The invention also relates to a roll-to-roll printing system for two-sided printing of digital images on a roll of media, the roll-to-roll printing system comprising at least one input holder for holding a roll of media, at least one output holder for holding the printed roll, a control unit comprising a digital image queue comprising an entry for each digital image to be printed on a first side of the roll and comprising an entry for each digital image to be printed on the second side of the roll, each entry comprising a first digital item identifying the digital image and digital items of print properties of the digital image, a user interface for displaying and manipulating an entry of the digital image queue, a print section for printing digital images on both sides of media of the roll according to the digital image queue, wherein the control unit comprises a first establishing section for establishing a first location on the first side of the roll at which first location the first digital image is intended to be printed, a second establishing section for establishing a second digital image which is intended to be printed at a second location on the second side of the roll, the second location being the backside of the first location, and a linking section for linking the first entry of the first digital image in the digital image queue to the second entry of the second digital image in the digital image queue by means of a linking digital item in the digital image queue, and the control unit is configured to execute a method according to the invention.

According to an embodiment of the roll-to-roll printing system the linking section is configured to make, after linking the first entry in the digital image queue to the second entry in the digital image queue, a digital image part of the user operable representation of the digital image queue on a user interface screen of the roll-to-roll printing system inoperable for a user, the digital image part corresponding to the second entry in the digital image queue.

According to an embodiment of the roll-to-roll printing system the control unit is configured to make, after printing the first digital image of the first entry in the digital image queue which first entry is linked to the second entry of the second digital image in the digital image queue, a digital image part of the user operable representation of the digital image queue on a user interface screen of the roll-to-roll printing system inoperable for a user, the digital image part corresponding to the second entry in the digital image queue.

The invention also relates to a non-transitory recording medium comprising computer executable program code configured to instruct a computer to perform a method according to the invention.

It may be clear for the skilled person that the previous embodiments of the methods may be combined in one way or another resulting in embodiments which also fall under the scope of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

Hereinafter the present invention is further elucidated with references to the appended drawings showing non-limiting embodiments and wherein.

It is noted that the same reference numerals have been used to identify the same or similar elements throughout the several views.

DETAILED DESCRIPTION OF EMBODIMENTS

Figure 1:
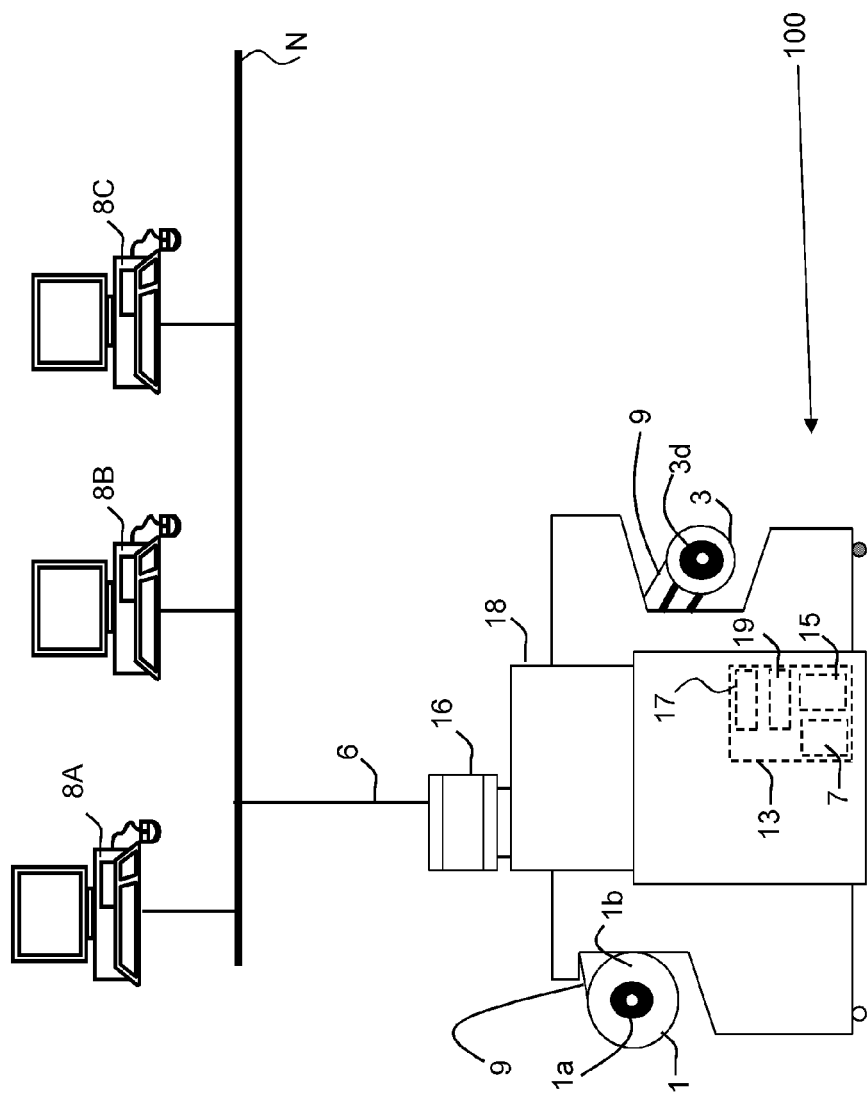
FIG. 1 schematically shows a roll-to-roll printing system in which the invented method is applicable.

FIG. 1 shows a roll-to-roll printing system 100 connected to a network N. The roll-to-roll printing system 100 is available for a user working with one of the workstations 8A-8C and intending to send a digital image from one of the workstations 8A-8C to a control unit 13 inside of the roll-to-roll printing system 100. The roll-to-roll printing system 100 is connected to the network N via wired or wireless connecting means 6 and suited for receiving digital images from the workstations 8A-8C. The network N may be wireless. The roll-to-roll printing system 100 comprises an input holder la for a media input roll 1 which may be unwound, printed upon and rewound on an output holder 3d forming a printed media output roll 3. The roll-to-roll printing system 100 comprises a user interface unit 16 suitable for displaying the digital image queue according to the invention by means of digital images to be printed, a digital representation of the roll 1, 3 and a digital representations of digital images intended to be printed on the roll 1, 3.

The control unit 13 comprises a construction module 17 for constructing a composed digital image representing the digital image queue according to the invention and configured to be shown on the user interface unit 16. The control unit 13 comprises a scheduler 19 for scheduling the digital images submitted to the roll-to-roll printing system 100 in the digital image queue according to the invention. The digital image queue is stored in digital storage 7 in the control unit 13. The control unit 13 comprises a controller 15 for controlling the printing process and data transfer between the control unit 13 and the user interface unit 16.

In another embodiment the control unit of the roll-to-roll printing system 100 is integrated in one of the workstations 8A-8C. In this embodiment the composed digital image is constructed at the one of the workstation 8A-8C wired or wireless connected to roll-to-roll printing system 100. In another embodiment a user interface is provided as a network web site or intranet site that is accessible with a browser on a client computer.

The control unit 13 is suited to store a set of digital images, to check whether or not the digital images can be printed and to submit a digital image to a print unit 18 of the roll-to-roll printing system 100 in order to be printed on the input roll 1. Image data of a digital image are stored in digital storage 7 in the control unit 13 at least for the time period that the digital image is printed by the print unit 18. Image data may also be stored in memory of at least one of the workstations 8A-8C. The composed digital image may also be stored in memory of the at least one of the workstations 8A-8C. The roll-to-roll printing system 100 processes at least part of media on the input roll 1. The wound media has a length which is defined as a largest dimension of the media when unrolled. Media material may be paper, textile, transparent sheet material, plastic or any other kind of material or substrate suitable for winding up on the input roll. Individual digital images will be printed on media 9 given out of the input roll 1. The individual digital images are printed by the print unit 18 of the roll-to-roll printing system 100 according to the digital image queue. The media 9 of the input roll 1 is guided along the print unit 18. The print unit 18 is ejecting marking material on the media 9 to form the printed digital images. The printed media 9 is guided to and wound up on the output holder 3d of the output roll 3.

The roll-to-roll printing system 100 in FIG. 1 comprises one input holder and one output holder. However, roll-to-roll printing systems comprising a plurality of input holders and/or a plurality of output holders may be envisioned to be configured to execute the method according to the present invention.

Figure 2:
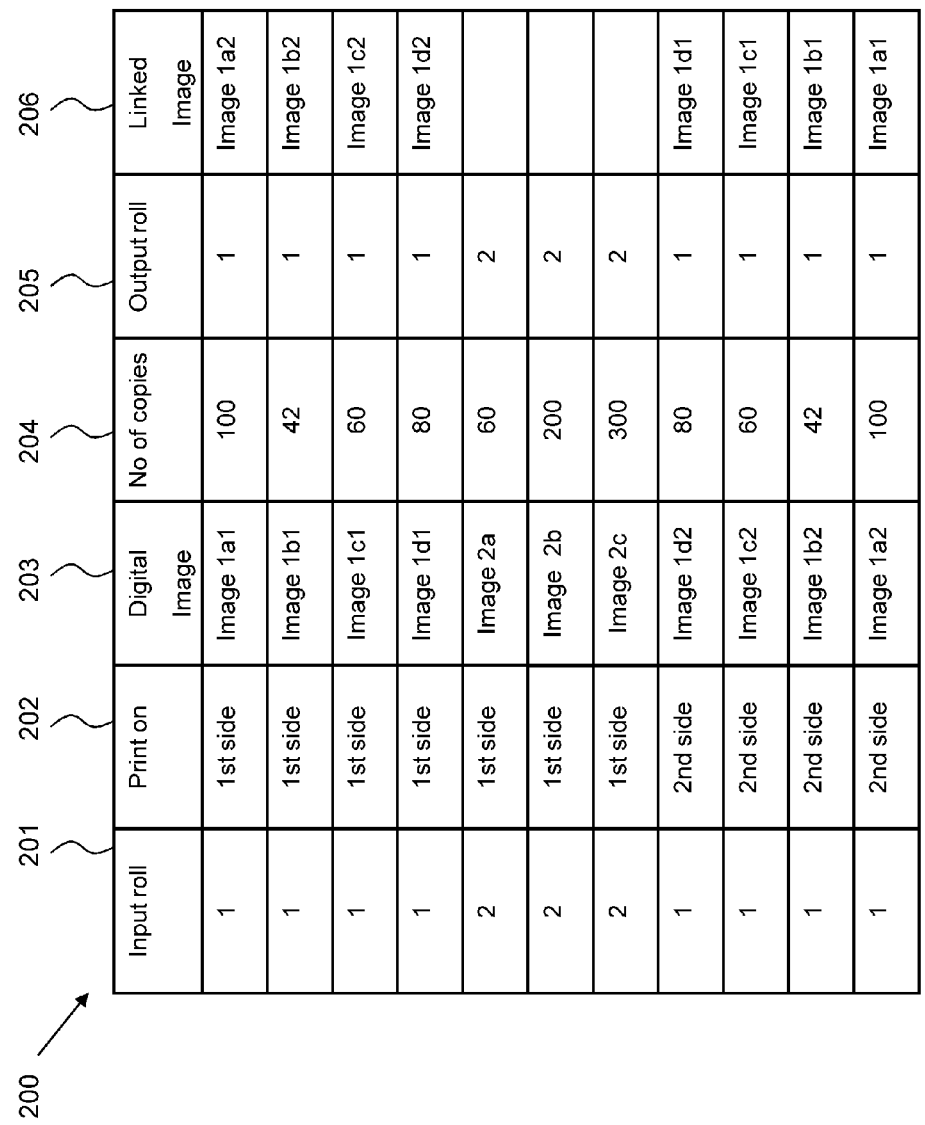
FIG. 2, 6, 9 show internal storage representations of a digital image queue according to the invention.

FIG. 2 schematically shows an internal storage representation 200 of the digital image queue usable by the scheduler 19 in the control unit 13 of the roll-to-roll printing system 100 shown in FIG. 1. A first column 201 indicates identification numbers 1, 2 of the input roll. A third column 203 indicates identifications of or link to the digital images 1a1, 1b1, 1c1, 1d1, 1d2, 1c2, 1b2, 1a2 which are intended to be printed on the input roll 1, and the digital images 2a, 2b, 2c which are intended to be printed on the input roll 2. A second column 202 indicates on which side of the roll the digital images are intended to be printed. Digital images 1a1, 1b1, 1c1, 1d1 are intended to be printed on a first side of the roll. The first side of the roll is a side of the roll which is firstly scheduled to be printed upon. Digital images 1d2, 1c2, 1b2, 1a2 are intended to be printed o a second side of the roll. The second side of the roll is a side of the roll which is secondly scheduled to be printed upon, when the one-sided printed roll 1 has been removed from the output holder 3a and reloaded on the input holder 1a. Input roll 2 will be only one-sided printed as indicated in the second column 202. A fourth column 204 indicates a number of copies to be printed on the input roll 1. A fifth column 205 indicates an identification number 1, 2 of the output rolls. A sixth column 206 may comprise a linking digital item comprising an identification of or a link to a digital image as in the third column 203 according to the method of the invention. For example, digital images 1a1, 1b1, 1c1, 1d1 are linked to digital images 1a2, 1b2, 1c2, 1d2 respectively. Entries of the sixth column 206 corresponding to digital images to be printed on the input roll 2 are empty, because the roll 2 is intended to be only one-sided printed upon. Other properties of a digital image in the digital image queue may be incorporated in the digital image queue by adding appropriate columns or may be linked to via the identifications of or links to the digital images 1a1, 1b1, 1c1, 1d1, 2a, 2b, 2c, 1d2, 1c2, 1b2, 1a2. The sequence order of printing the digital images 1d2, 1c2, 1b2, 1a2 on the second side of the roll 1 is reversely reflected in the digital image queue with respect to the linked digital images 1a1, 1b1, 1c1, 1d1 printed or intended to be printed on the first side of the roll 1, since printing on the second side on the roll 1 starts from the end of the wound up roll 1.

Values for each entry in the digital image queue may be generated automatically from submitted print jobs comprising the digital images to be printed together with a print job ticket specifying media requirements like size, media quality, single-sided printing, two-sided printing and a desired print mode. Specifications of the input rolls like width and media quality are considered to be registered by the control unit 13 of the roll-to-roll printing system 100 due to prior input by an operator. Specifications of the input rolls like width and media quality may also be registered by the control unit 13 of the roll-to-roll printing system 100 by means of default values so that at a later moment in time these values may be changed by operator input via the user interface 16.

Values for each entry in the digital image queue may also be entered and/or changed by means of the user interface 16 of the roll-to-roll printing system 100 since the user interface 16 is capable of displaying a constructed digital image representing the digital image queue to the operator.

Figure 3:
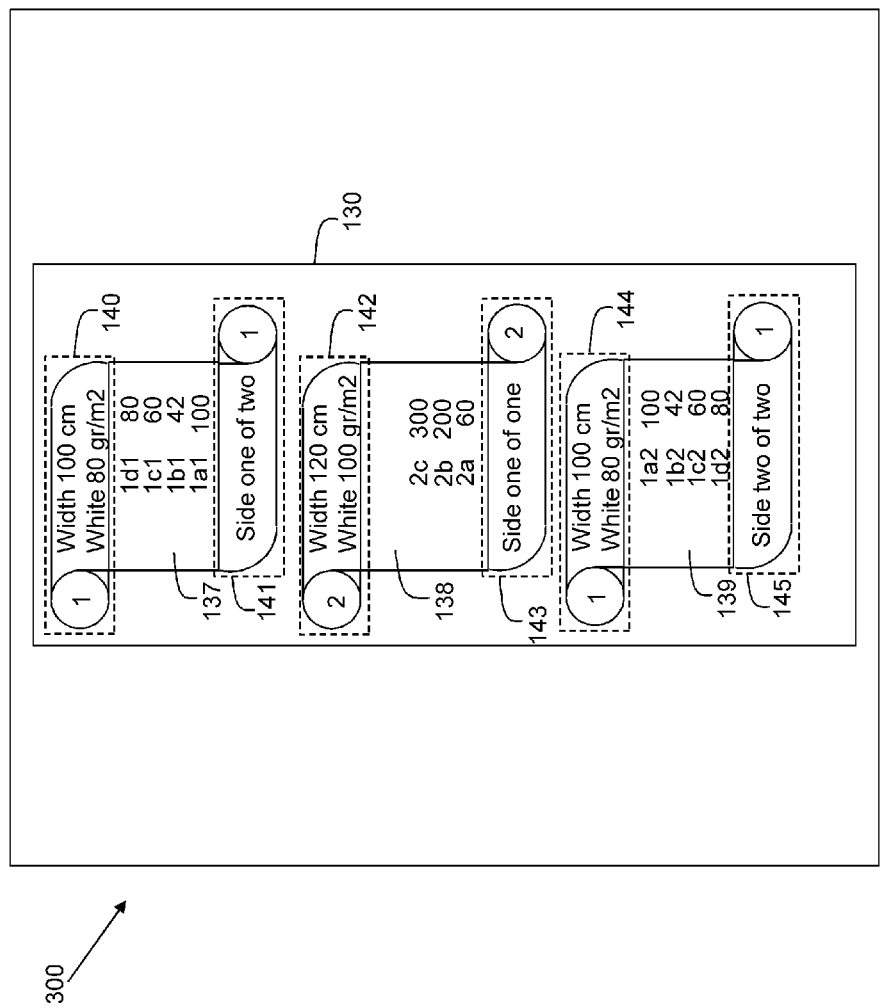
FIGS. 3-5, 7-8, 10-14 schematically show windows on the user interface of the roll-to-roll system comprising a representation of the digital image queue according to the invention.

FIG. 3 shows a user interface screen 300 comprising a constructed composed digital image 130. The constructed composed digital image 130 comprises digital representations 140, 144 corresponding to the input roll numbered 1, a digital representation 141 corresponding to the one-sided printed input roll 1, a digital representation 145 corresponding to the two-sided printed input roll 1, a digital representation 142 corresponding to a second input roll 2, and a digital representation 143 corresponding to the printed second input roll 2.

The second input roll 2 is not necessarily to be scheduled according to the invention, but is merely shown in FIG. 3 to indicate that printing on the first side of the input roll 1 does not have to be immediately followed by printing on the second side of the input roll 1, but may be followed by printing on at least one other input roll, in this example input roll numbered 2.

The digital representations 140-145 are roll digital operable items for the operator. A scrollable surface 137 between the digital representation 140 and the digital representation 141, a scrollable surface 138 between the digital representation 142 and the digital representation 143, and a scrollable surface 139 between the digital representation 144 and the digital representation 145 is provided to display digital images to be printed on the first side of the input roll 1, on a first side of the input roll 2 and on a second side of the input roll 1 respectively. In the surfaces 137-139 also the number of copies per digital image to be printed is shown.

A sequence order of the locations in the scrollable surface 137 of the digital images 1a1, 1b1, 1c1, 1d1 to be printed on the first side of the roll 1 reflects the chronological order in which the digital images are printed on the media of the roll 1. Firstly, digital image 1a1 is printed, then digital image 1b1, then digital image 1c1, etc. Therefore the printed digital image 1a1 is closest to the core of the one-sided printed roll 1, the printed digital image 1b1 is then closest to the core, the printed digital image 1c1 is then closest to the core, etc.

A sequence order of the locations in the scrollable surface 139 of the digital images 1a2, 1b2, 1c2, 1d2 to be printed on the roll 1 reflects the chronological order in which the digital images are printed on the media of the second side of the roll 1. Firstly, digital image 1d2 is printed, then digital image 1c2, then digital image 1b2, etc.

Therefore the printed digital image 1d2 is closest to the core of the two-sided printed roll 1, the printed digital image 1c2 is then closest to the core, the printed digital image 1b2 is then closest to the core, etc.

The digital representations 140-145 are selectable by touching or clicking in an operable area indicated by dashed rectangles. For example, media properties of the roll 1 may be added and/or changed in a selected digital representation 140. For example, a combination of digital representations 140, 141 and surface 137 may be moved—for example dragged—to a new upward or downward location in the composed digital image 130 to enable re-ordering of printing on rolls.

Digital representations 141, 143, 145 of printed rolls 1, 2 display an information item of which side is printed upon or is intended to be printed upon.

The surfaces 137-139 may also be editable with respect to changing the number of copies, with respect to removing a digital image representation from the surface 137, 138, 139, and with respect to changing the sequence order of printing of the digital images on the roll, for example by dragging a digital image representation in the surface 137, 138, 139 to another location in the surface 137, 138, 139 or even to another surface in the composed digital image 130.

Digital images 1a1, 1b1, 1c1, 1d1 are intended to be printed on a first side of the roll 1 and the digital images 1a2, 1b2, 1c2, 1d2 are intended to be printed on the second side of the roll 1. The digital images 1a1, 1b1, 1c1, 1d1 are linked to the digital images 1a2, 1b2, 1c2, 1d2 respectively according to the method of the invention.

The linking step may be done automatically when the digital images are scheduled on the roll 1 after submission of the digital images to the control unit of the roll-to-roll printing system. The linking step may be implicit done according to the sequence order of dragging digital images to be printed on the roll 1 to the surfaces 137, 139 as will be explained in FIG. 14.

According to an embodiment scrolling on surface 137 in a first direction leads to a simultaneously automatic scrolling on the surface 139 in a direction opposite to the first direction since the digital images on the surfaces 137, 139 are linked, and vice versa, scrolling on surface 139 in a first direction may lead to a simultaneously automatic scrolling on the surface 137 in a direction opposite to the first direction since the digital images on the surfaces 137, 139 are linked.

Figure 4:
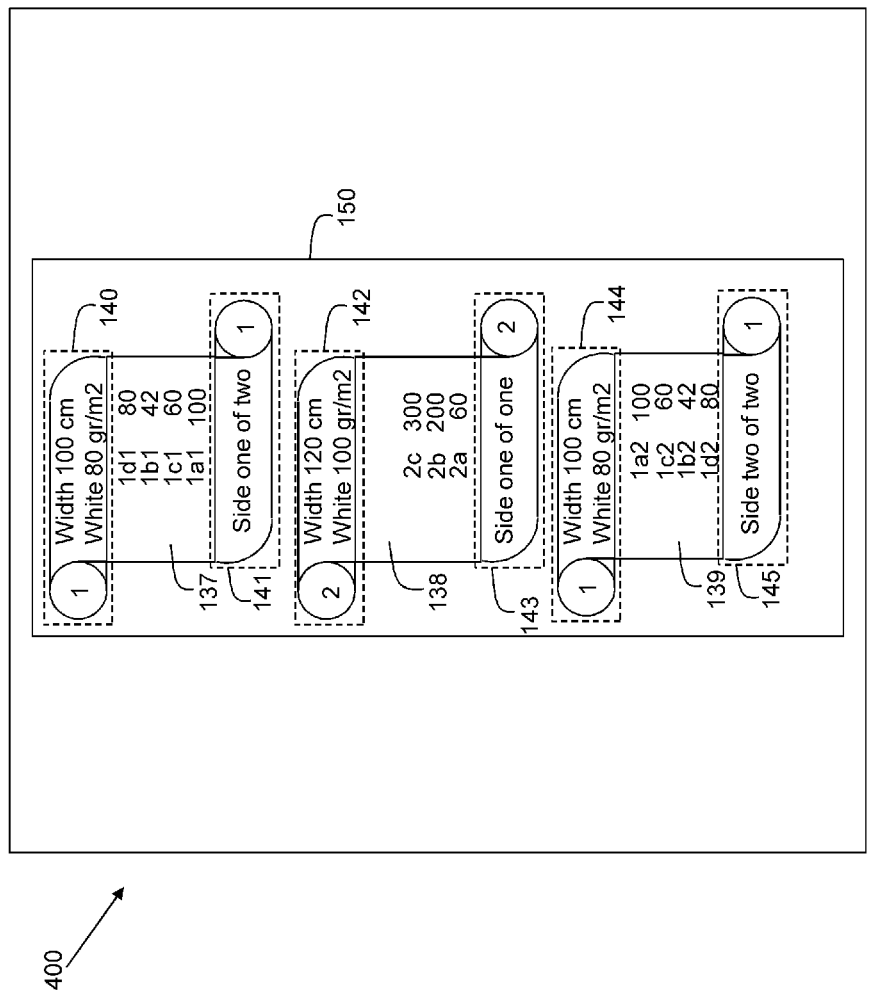

FIG. 4 shows a user interface screen 400 comprising the constructed composed digital image 150 according to the present invention.

Figure 6:
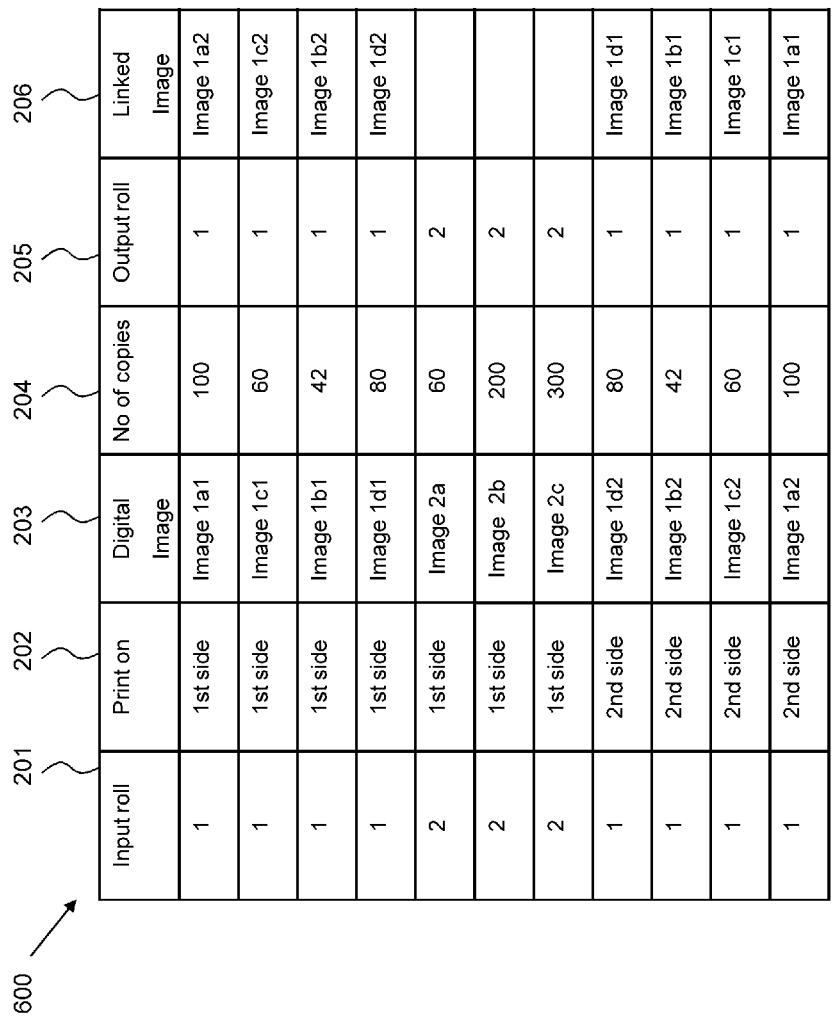

By dragging the digital representation of the digital image 1b1 to another position on the surface 137, the sequence order of intended printing of the digital images 1a1, 1b1, 1c1, 1d1 on the first side of the roll 1 has been changed. Automatically the representation of the digital image 1b2 which is linked to the dragged digital image 1b1 is moved to another position on the surface 139. The indications of the number of copies of the digital images 1b1, 1b2 have been moved accordingly. The change of the sequence order of the digital representations of the digital images 1b1, 1b2 automatically results in an underlying change of locations of the entries of the digital images 1b1, 1b2 in the digital image queue 600 as shown in FIG. 6.

Mutatis mutandis, the situation shown in FIG. 4 may also be established by dragging the digital representation of the digital image 1b2 to another position on the surface 139. the sequence order of intended printing of the digital images 1a2, 1b2, 1c2, 1d2 on the second side of the roll 1 has been changed. Automatically the representation of the digital image 1b1 which is linked to the dragged digital image 1b2 is moved to another position on the surface 137. The indications of the number of copies of the digital images 1b1, 1b2 have been moved accordingly. The change of the sequence order of the digital representations of the digital images 1b1, 1b2 automatically results in an underlying change of locations of the entries of the digital images 1b1, 1b2 in the digital image queue 600 as shown in FIG. 6.

A first digital image representation may also be deleted from the surface 137 by means of swiping out of the surface 137 or pressing a delete button (not shown) after selecting the first digital image representation. Upon deletion of the first digital image representation from the surface 137 a second digital image representation on surface 139 is also automatically deleted, the second digital image representation being the digital image representation which represents the digital image which is linked to a digital image which is represented by the first digital image representation.

A third digital image representation may also be deleted from the surface 139 by means of swiping out of the surface 139 or pressing the delete button (not shown) after selecting the third digital image representation. Upon deletion of the third digital image representation from the surface 139 a fourth digital image representation on surface 137 is also automatically deleted, the fourth digital image representation being the digital image representation which represents the digital image which is linked to a digital image which is represented by the third digital image representation.

The deletion of digital representations of digital images automatically results in an underlying deletion of the corresponding entries of said digital images in the digital image queue according to the invention.

Figure 5:
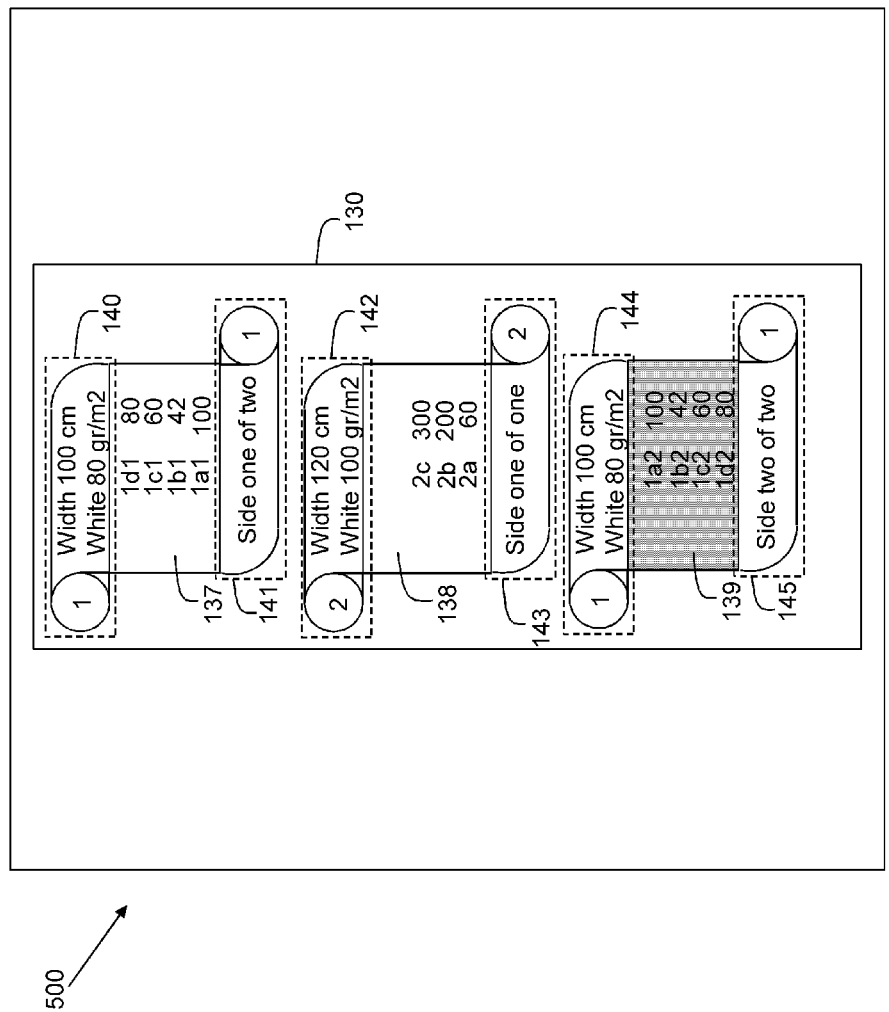

FIG. 5 shows a user interface screen 500 comprising the constructed composed digital image 150 according to alternative embodiment of the present invention. The step of linking the digital images 1a1, 1b1, 1c1, 1d1 on the first side of the roll 1 to the digital images 1a2, 1b2, 1c2, 1d2 on the second side of the roll 1 comprises the step of making the representations of the digital images 1a2, 1b2, 1c2, 1d2 intended to be printed on the second side of the roll 1 inoperable for a user. The surface 139 has been greyed out to indicate said inoperability. The user is not able to change the order of the digital images 1a2, 1b2, 1c2, 1d2 in the surface 139. Only the sequence order of the digital images 1a1, 1b1, 1c1, 1d1 is editable in the surface 137. Due to the linking of the digital images in the surfaces 137, 139, a change made to the sequence order of the digital images in the surface 137 will result in an automatic and corresponding change in the sequence order of the digital images in the surface 139.

By doing so, the user may have less confusion about a change at the second side of the roll since he can only make changes on the first side of the roll. This embodiment is preferable when the first side of the roll has been completely printed, since no changes are then allowed on the second side of the roll without disturbing the linking of the digital images printed on the first side of the roll 1 and intended to be printed on the second side of the roll 1.

Figure 7:
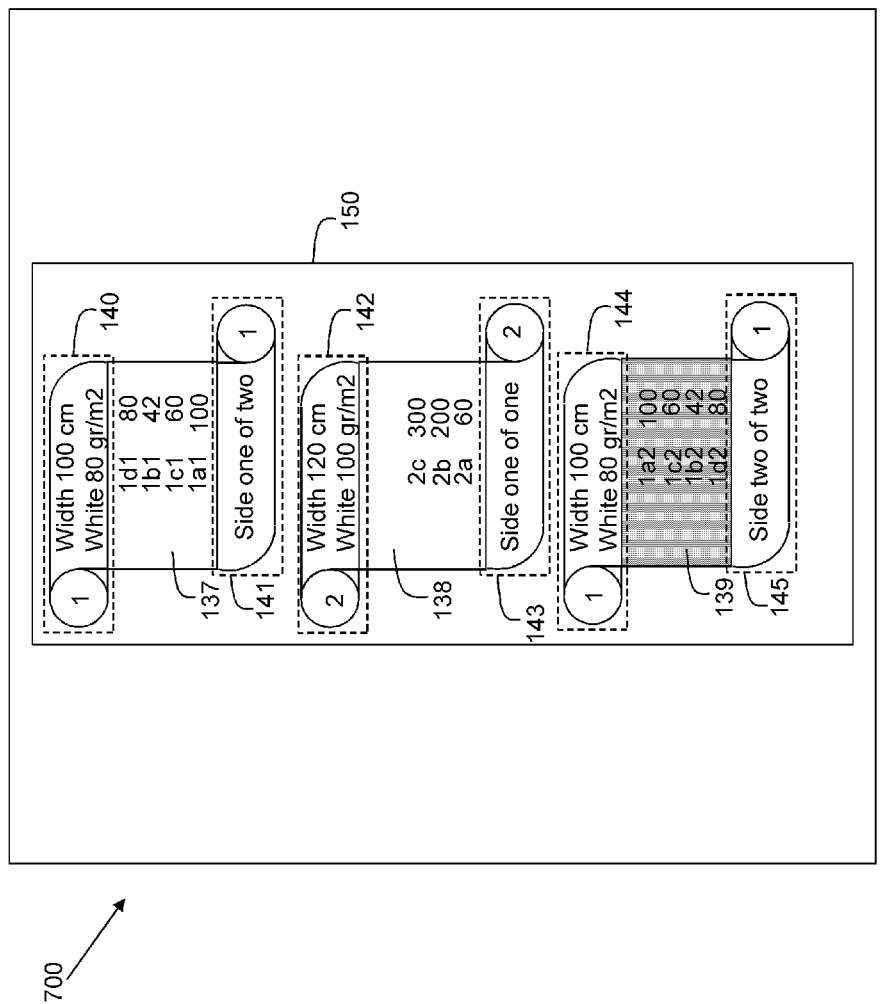

FIG. 7 shows a user interface screen 700 comprising the constructed composed digital image 130 after the change of the sequence order of the representations of the digital images 1b1, 1c1 on the surface 137. The step of linking the digital images 1a1, 1b1, 1c1, 1d1 on the first side of the roll 1 to the digital images 1a2, 1b2, 1c2, 1d2 on the second side of the roll 1 comprises the step of making the representations of the digital images 1a2, 1b2, 1c2, 1d2 intended to be printed on the second side of the roll 1 inoperable for a user. The surface 139 has been greyed out to indicate said inoperability. The user is not able to change the order of the digital images 1a2, 1b2, 1c2, 1d2 in the surface 139. Only the sequence order of the digital images 1a1, 1b1, 1c1, 1d1 is editable in the surface 137. However, due to the linking of the digital images in the surfaces 137, 139, the change made to the sequence order of the digital images in the surface 137 results in an automatic and corresponding change in the sequence order of the digital images 1b2, 1c2 in the surface 139 and an underlying change of the sequence order of the corresponding entries in the digital image queue of the roll-to-roll printing system.

Figure 8:
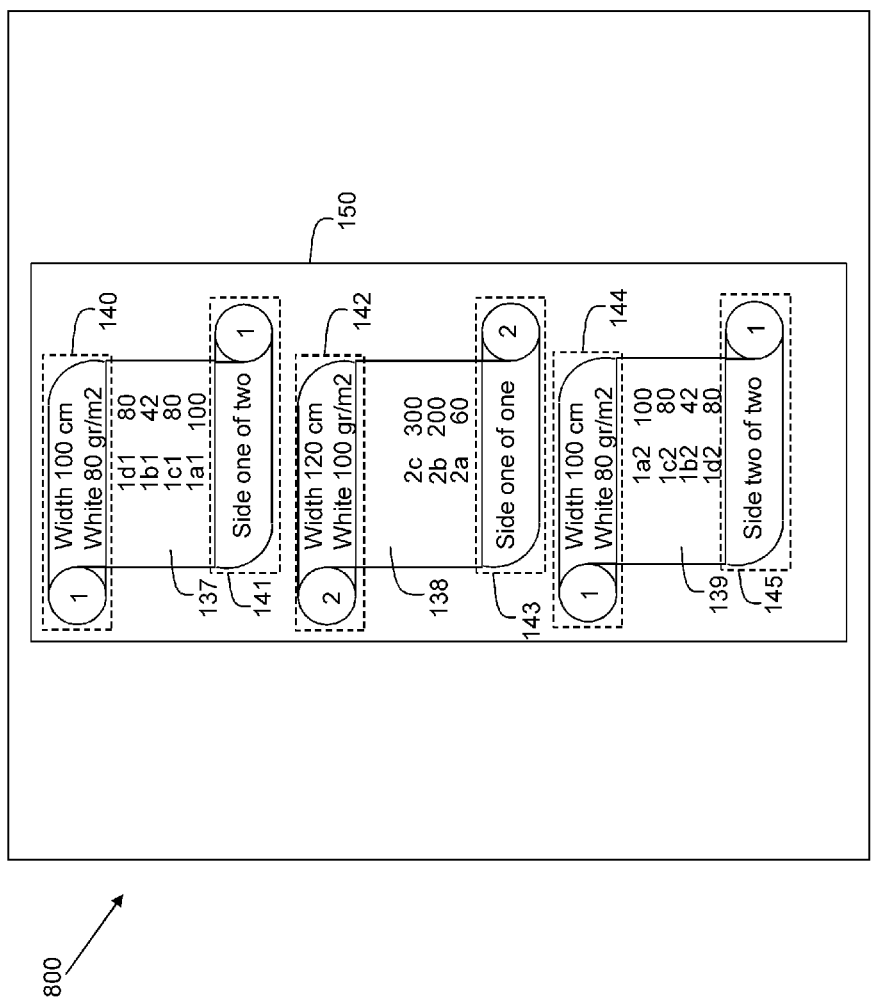
Figure 9:
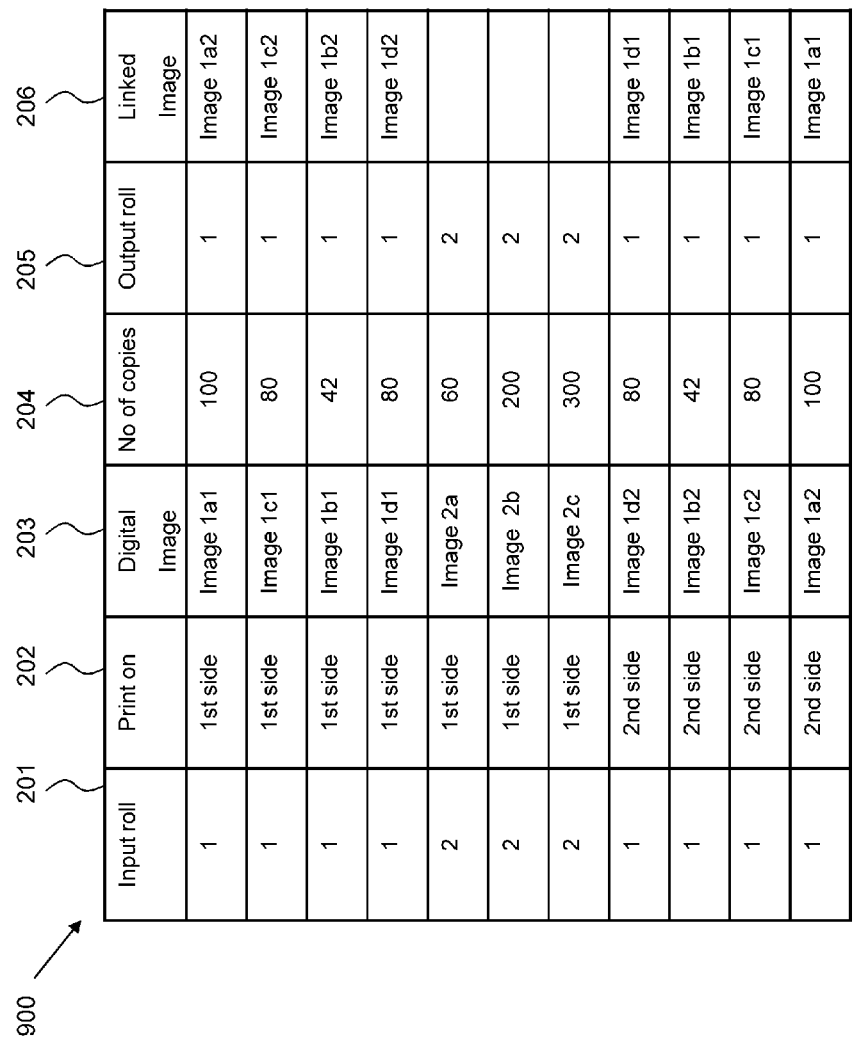

FIG. 8 shows a user interface screen 800 comprising the constructed composed digital image 150 according to the present invention. By changing the number of copies of the digital image 1c1 on the surface 137, automatically the number of copies, i.e. 60, of the digital image 1c2 which is linked to the digital image 1c1 is changes into 80. The change of the number of copies of the digital images 1c1, 1c2 automatically results in an underlying change of the number of copies in the fourth column 204 of the entries of the digital images 1c1, 1c2 in the digital image queue 900 as shown in FIG. 9.

Figure 10:
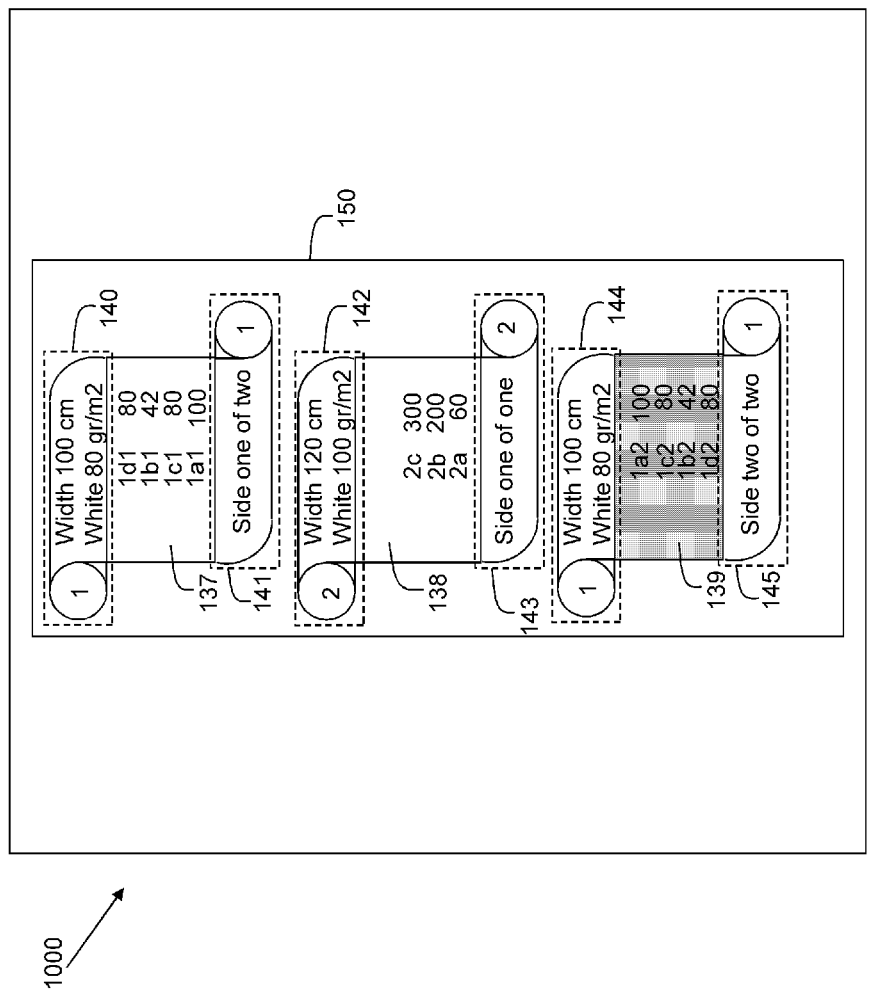

FIG. 10 shows a user interface screen 1000 comprising the constructed composed digital image 150 according to another embodiment after the change of the number of copies as mentioned here-above. The constructed composed digital image 150 shows a blocking of the surface 139 in order to prohibit the user to change a sequence order of the representations of the digital images 1a2, 1b2, 1c2, 1d2 on the surface 139 or to change any number of copies of the digital images 1a2, 1b2, 1c2, 1d2 on the surface 139. The surface 139 has been greyed out to indicate said inoperability.

Figure 11:
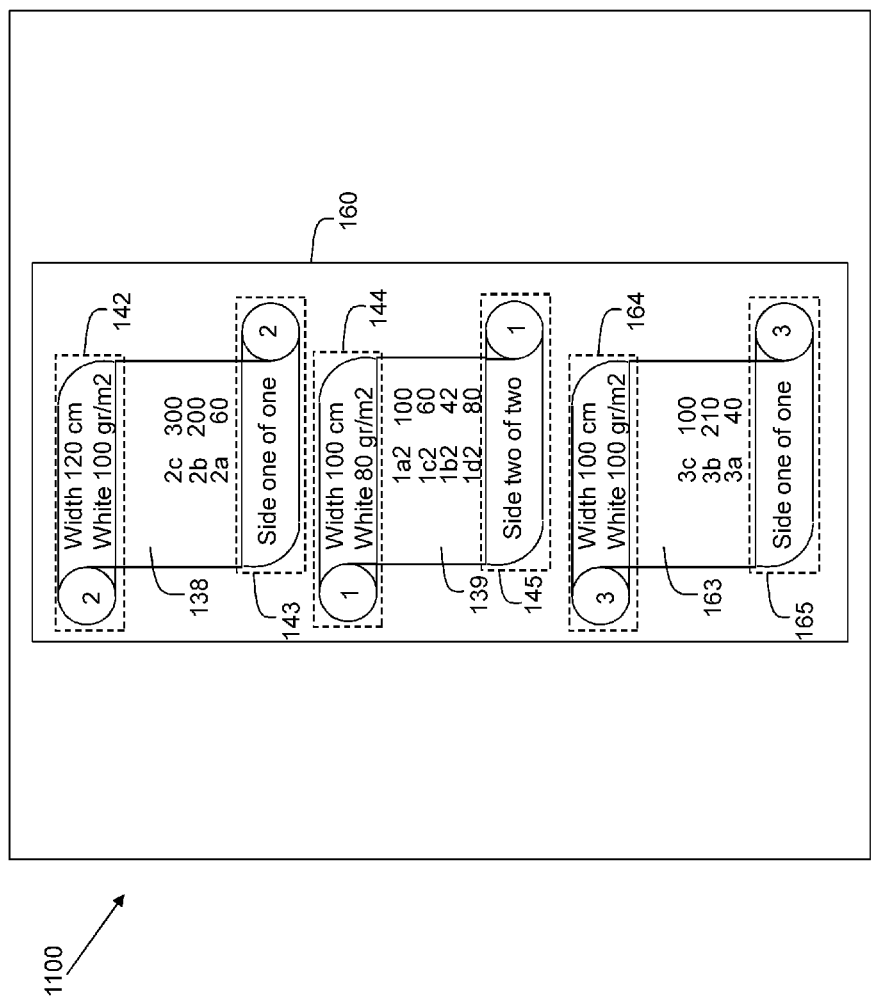

FIG. 11 shows a user interface screen 1100 comprising the constructed composed digital image 160 when the roll 1 has been completely printed on the first side. An image part representing the printing of the digital images 1a1, 1b1, 1c1, 1d1 on the first side of the roll 1 is not visible any more in the constructed composed digital image 160. Not before, but after the first side of the roll 1 has been printed upon, the surface 139 representing the digital images 1a2, 1b2, 1c2, 1d2 to be printed upon the second side of the roll 1 is made inoperable. This leaves a possibility and more flexibility for the user to change, before starting the printing on the second side of the roll 1, a sequence order of the linked digital images still to be printed on the first and second side of the roll 1. As indicated before, the blocking of the surface 139 is preferable after the first side of the roll 1 has been completely printed.

Figure 12:
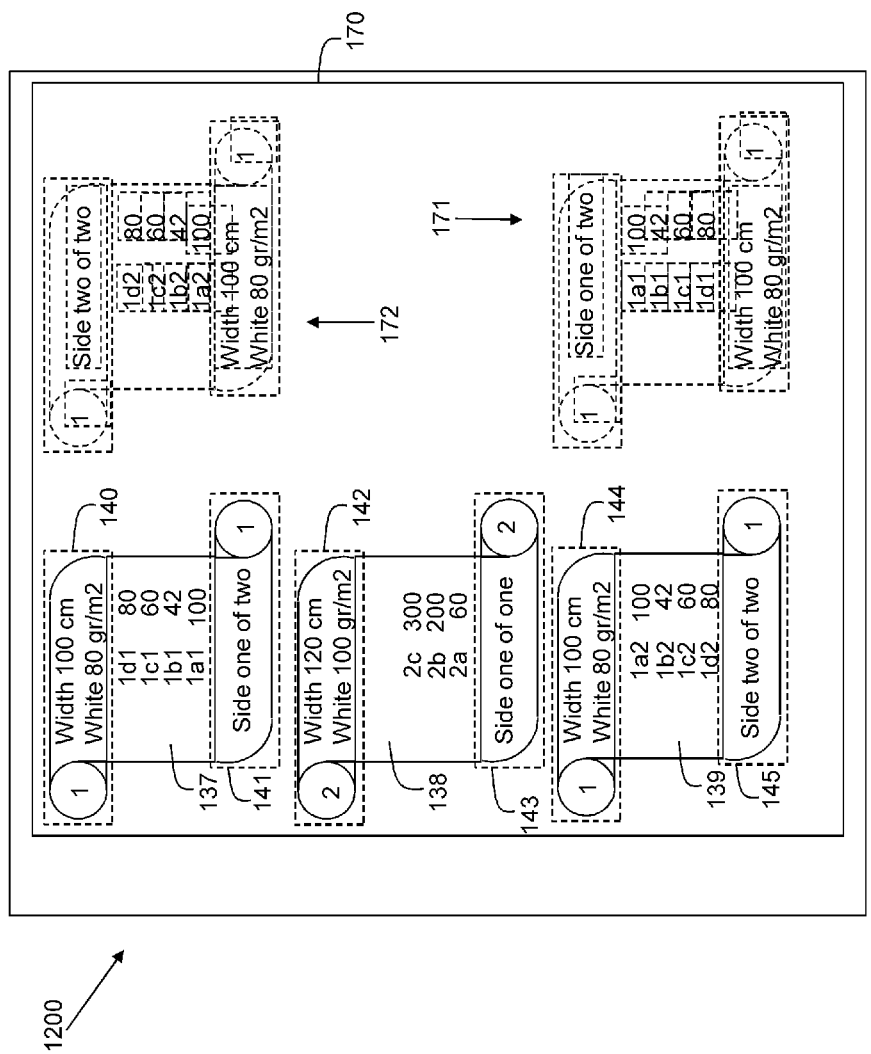

FIG. 12 shows a user interface screen 1200 comprising a constructed composed digital image 170 according to another embodiment of the invention. Besides the already shown representations of the digital images intended to be printed on the first side of roll 1 and intended to be printed on the second side of roll 1, the constructed composed digital image 170 displays a dashed representation 172 near the representations 140, 137, 141 of the digital images to be printed on the first side of the roll 1. The dashed representation 172 is an upside-down copy of the digital representations 145, 139, 144 representing the digital images to be printed on the second side of the roll 1. The constructed composed digital image 170 also displays a dashed representation 171 near the representations 144, 139, 145 of the digital images to be printed on the second side of the roll 1. The dashed representation 171 is an upside-down copy of the digital representations 141, 137, 140 representing the digital images to be printed on the first side of the roll 1.

By doing so, the user can immediately see which digital image intended to be printed on the first side of the roll 1 is linked to which digital image intended to be printed on the second side of the roll 1.

The representations 171, 172 are dashed; however other ways of visually distinguishing the representations 171, 172 may be envisioned.

When printing the digital images represented in surface 139 on the second side of the roll 1, the user is able to see on the one-sided printed roll 1 which digital image is printed on the first side of the roll 1. Therefore he is able to compare a printed digital image on a location on the first side of the roll 1 and on the backside of said location on the second side of the roll 1 with the displayed representations in surface 139 and in the dashed representation 171 according to the user interface screen 1200.

Figure 13:
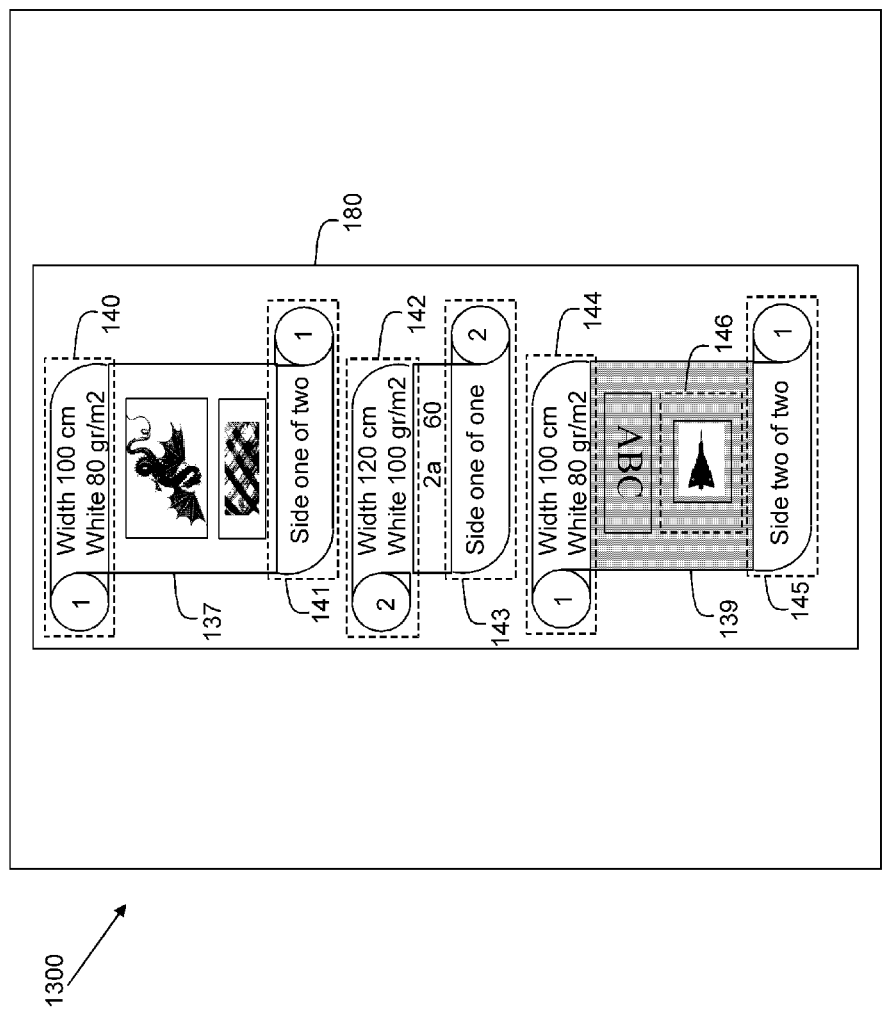

FIG. 13 shows a user interface screen 1300 comprising a constructed composed digital image 180 according to another embodiment of the invention. The representations of the digital images on the surfaces 137, 139 are now in the form of real preview images being images of a dragon, a green pattern, an "ABC" word and a drone. According to another embodiment thumbnail images may be shown.

The surfaces 137, 139 now represent the area of the roll 1 and a position of a real preview image on the surface 137, 139 corresponds to the intended position of the digital images when printed on the first as well as on the second side of the roll 1.

In FIG. 13 the real preview images are centred with respect to the width of the roll 1. The digital images of the green pattern and the dragon are firstly printed on the first side of the roll 1 and the digital images of the drone and the "ABC" word are later on printed on the second side of the roll 1. The digital image of the drone is intended to be printed on the back side of the printed digital image of the dragon, while the digital image of the "ABC" word is intended to be printed on the back side of the printed digital image of the green pattern.

The sizes of the digital images of the green pattern and the "ABC" word are the same and the corresponding printed digital images on the first and second side of the roll 1 will completely overlap each other.

The size of the digital image of the drone is smaller than the size of the digital image of the dragon. Before printing the digital image of the drone on the backside of the printed digital image of the dragon, the digital image of the drone is centred on the second side of the roll to the centre of the printed digital image of the dragon on the first side of the roll 1. The size of the digital image of the dragon is indicated on the surface 139 by the dashed rectangle 146.

According to an embodiment of the method of the invention a left margin specified for the digital image of the green pattern is taken into account when printing the linked digital image of the "ABC" word on the second side of the roll 1. A left margin of the digital image of the "ABC" word may be made equal to the left margin of the digital image of the green pattern. The digital image of the "ABC" word is rotated $\pi$ radians before printing the digital image of the "ABC" word on the second side of the roll 1.

Mutatis mutandis, this measure also counts for the digital image of the dragon and its corresponding digital image of the drone. Mutatis mutandis, this measure also counts for a right margin specified for the respective digital images.

According to an embodiment of the method of the invention a top margin specified for the digital image of the green pattern is taken into account when printing the linked digital image of the "ABC" word on the second side of the roll 1. A bottom margin of the digital image of the "ABC" word is made equal to the top margin of the digital image of the green pattern and the digital image of the "ABC" word is rotated $\pi$ radians before printing the digital image of the "ABC" word on the second side of the roll 1. A bottom margin for the digital image of the green pattern is taken into account when printing the linked digital image of the "ABC" word on the second side of the roll 1. A top margin of the digital image of the "ABC" word is made equal to the bottom margin of the digital image of the green pattern and the digital image of the "ABC" word is rotated $\pi$ radians before printing the digital image of the "ABC" word on the second side of the roll 1. Mutatis mutandis, this measure also counts for the digital image of the dragon and its corresponding digital image of the drone.

Figure 14:
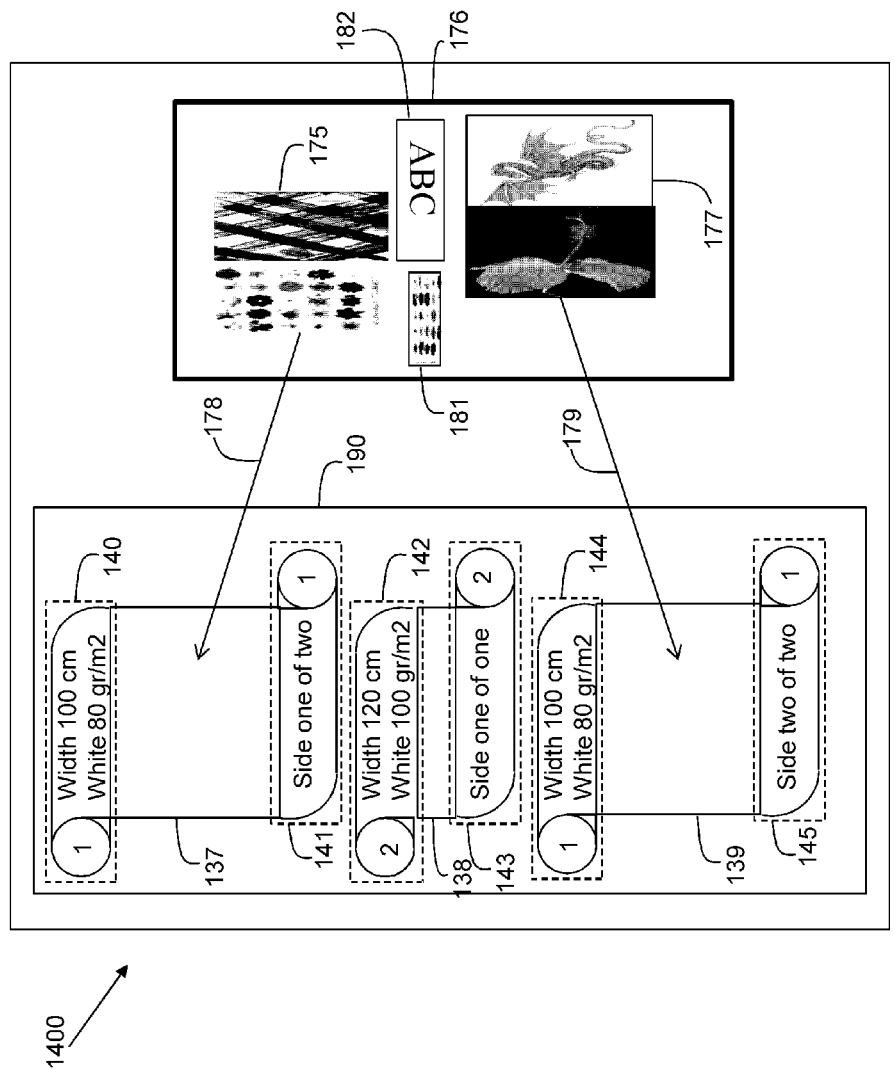

FIG. 14 shows a user interface screen 1400 with added functionality. FIG. 14 shows again the constructed composed digital image 190 and a window 176 comprising a plurality of digital images 175, 177, 181, 182. The window 176 may represent a particular part of the memory such as a hot folder or an image file directory. The window 176 represents a digital user operable pool item of available digital images to be printed but not yet scheduled on a roll of media. Each of the plurality of digital images 175, 177, 181, 182 may be selected and dragged from the window 176 and dropped on the constructed composed digital image 190.

A first digital image 175 may be added to the constructed composed digital image 190 by dragging and dropping the first digital image 175 onto a place at the constructed composed digital image 190 indicated by a first arrow 178. Since the first digital image 175 is a two-sided digital image comprising two sub-images which have to be printed at each other's backside on the roll, the first digital image 175 is automatically split into a first sub-image to be positioned on the surface 137 and a second sub-image to be positioned on the surface 139. The first sub-image is intended to be printed on the first side of the roll 1. The second sub-image is intended to be printed on the second side of the roll 1 at the backside of the first sub-image. Entries of the first and second sub-image are automatically created in the digital image queue and linked to each other.

A second digital image 177 may be added to the constructed composed digital image 190 by dragging and dropping the second digital image 177 onto a place at the constructed composed digital image 190 indicated by a second arrow 179. Since the second digital image 177 is a two-sided digital image comprising two sub-images which have to be printed at each other's backside on the roll, the second digital image 177 is automatically split into a first sub-image to be positioned on the surface 139 and a second sub-image to be positioned on the surface 137. The first sub-image is intended to be printed on the second side of the roll 1. The second sub-image is intended to be printed on the first side of the roll 1 at the backside of the first sub-image. When the surface 139 is blocked, the digital images can only be dropped on the surface 137. Entries of the first and second sub-image are automatically created in the digital image queue and linked to each other.

When the first digital image 175 would be dropped on a surface 138 of the representation of the roll 2, the first digital image 175 is also automatically split into a first sub-image and a second sub-image. Both sub-images are then positioned on the same surface 138, since the roll 2 is only printed upon on one side of the media.

A third digital image 182 may be added to the constructed composed digital image 190 by dragging and dropping the third digital image 182 onto the surface 137 in the constructed composed digital image 190. Since the third digital image 182 is a single digital image, the third digital image 182 is intended to be printed on the first side of the roll 1, but not yet linked to a digital image on the second side of the roll 1. When a fourth digital image 181 being also a single digital image is added to the constructed composed digital image 190 by dragging and dropping the fourth digital image 181 onto the surface 139 in the constructed composed digital image 190, the fourth digital image 181 is intended to be printed on the second side of the roll 1, and automatically linked to the third digital image 182 on the first side of the roll 1 by means of linked entries in the digital image queue according to the invention. The fourth digital image 181 is then intended to be printed on the second side of the roll 1 at the backside of the third digital image 182 at the first side of the roll 1.

Each time a digital image is added to the constructed composed digital image 190, the controller checks if there is enough media left on the roll for the digital image to be printed. A warning for an end-of-roll situation respectively a start-of-roll situation may be shown in the constructed composed digital image 190 at the appropriate locations.

If a digital image having a specified image property—like a size or a media type—for which image property there is not yet any appropriate roll defined and visible at the constructed composed digital image 190, is dragged from the window 176 and dropped into the constructed composed digital image 190, an additional representation of a new roll with roll properties matching the specified image properties is created for the constructed composed digital image 190 on the user interface screen 1400. A new entry in the digital image queue is created accordingly.

If the digital image is a two-sided digital image a first new representation is created for the first side of a new roll with roll properties matching the specified image properties and a second new representation is created for the second side of the new roll. New entries in the digital image queue are created accordingly.

Instead of dragging and dropping an image on the user interface screen 1400 which is a touch screen, the image may be selected by a mouse and moved by means of the mouse to the desired place on the constructed composed digital image 190. An image may also be dragged and dropped onto a place between two images already placed on the constructed composed digital image 190. In this way the sequence order of images in the constructed composed digital image 190 may be changed. This is allowed as long as the two images on the constructed composed digital image 190 are not yet printed and the digital images linked to the two images are not yet printed. A particular image on the constructed composed digital image 190 may also be moved in the surface 137, 139 as long as the particular image or an image linked to the particular image is not yet printed on the roll 1.

According to an embodiment of the present invention the user interface is provided with a zoom function for zooming in on or out of the constructed composed digital image 190. The zoom function may be realized with a zoom in button and a zoom out button. In case of a touch screen the zoom function may be realized by pinching or spreading by two fingers at a digital image in a digital representation of an input roll in the constructed composed digital image 190. By zooming in, the digital representations of the digital images to be printed become more detailed and more visible for an operator.

According to a further embodiment a representation of another digital image which is linked to a particular digital image is automatically zoomed in to respectively zoomed out of, when the particular image is zoomed in to or zoomed out of respectively.

According to an embodiment of the present invention the individual digital images on the surfaces 137, 138, 139 are represented by thumbnail images. Each thumbnail image may be placed on a grey background digital image which is displayed on the digital representation of the appropriate roll 1, 2 to indicate an area on the roll at which the digital image corresponding to the thumbnail image in the grey background digital image is printed. The background image may also comprise additional information such as the file name of the individual digital image, the last amended date of the individual digital image, the usage of each color when printing the individual digital image and an absolute end time when the printing of the individual digital image is completed.

The features of the user interface screens shown in FIGS. 3-5, 7-8, 10-14 may be combined in one user interface screen. Switch or selection buttons may be introduced on the user interface screens in order to be able to switch between the embodiments of the respective user interface screens.

Figure 15:
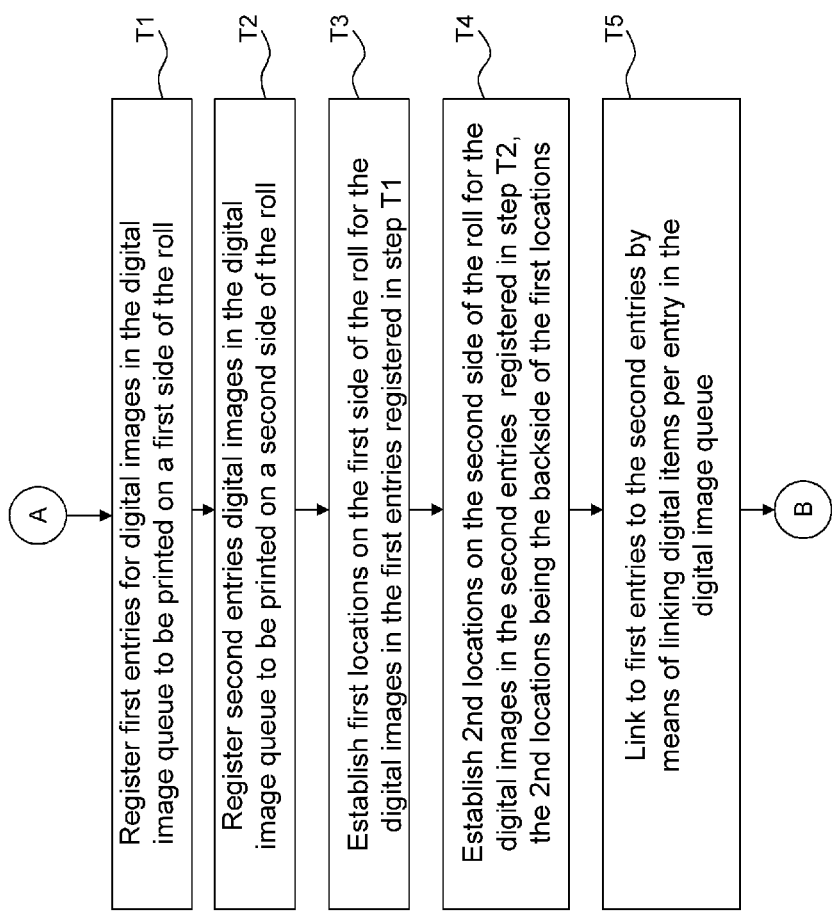
FIG. 15-17 is a flow diagram of the method according to the invention.
Figure 16:
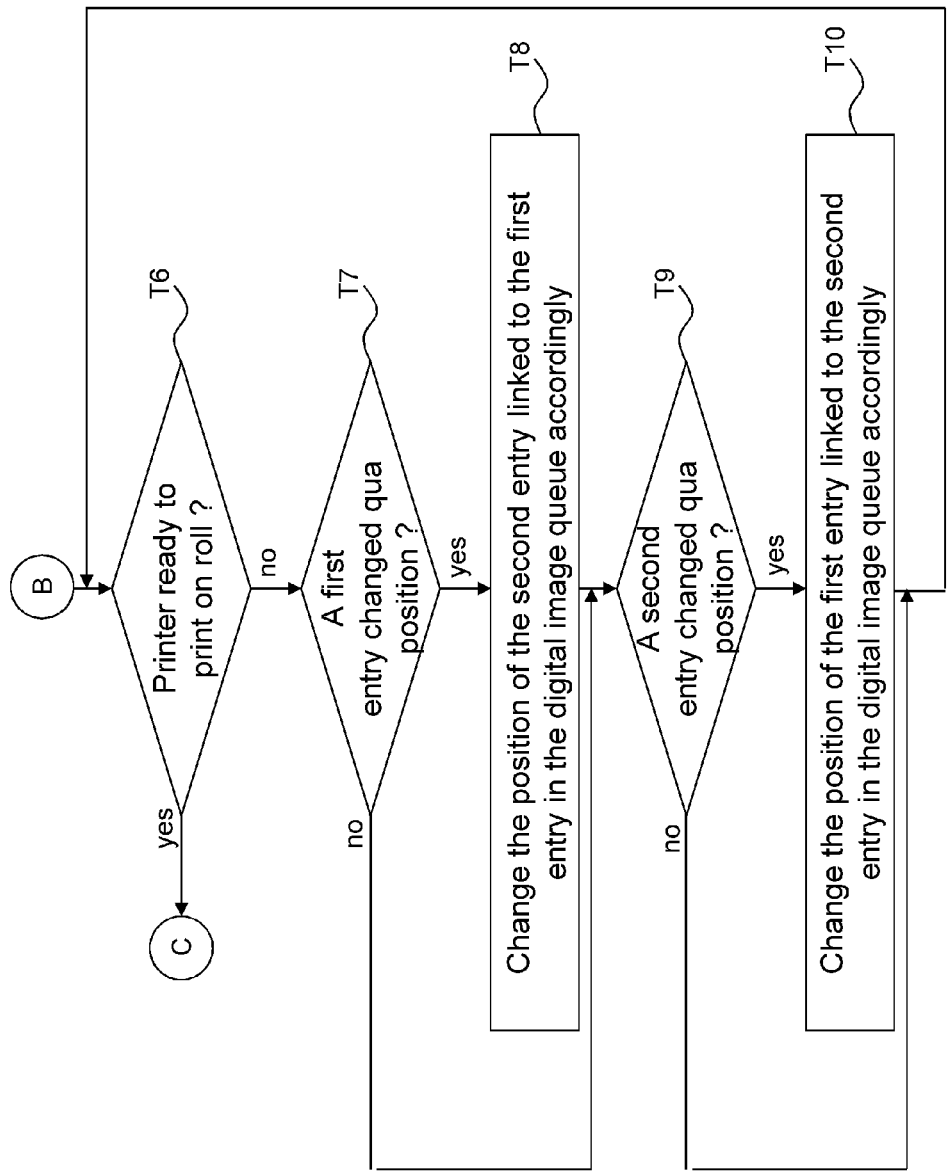
Figure 17:
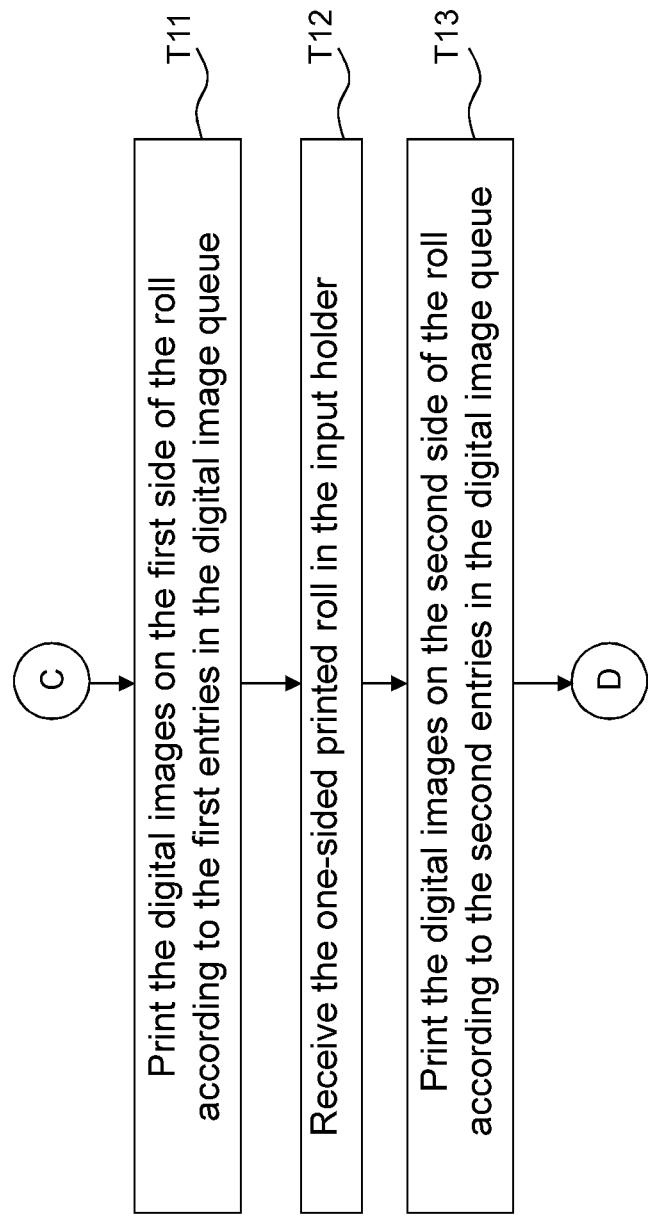

FIG. 15-17 is a flow diagram of the method according to the invention. From a starting point A in FIG. 15 a first step T1 is reached.

In the first step T1 for each digital image to be printed on a first side of the roll a first entry is registered in the digital image queue. The entry comprises at least one digital item identifying the digital image and digital items of print properties of the digital image.

In a second step T2 for each digital image to be printed on a second side of the roll a second entry is registered in the digital image queue. The entry comprises at least one digital item identifying the digital image and digital items of print properties of the digital image.

In a third step T3 for each first digital image to be printed on the first side of the roll, a first location is established on the first side of the roll at which first location the first digital image is intended to be printed.

In a fourth step T4 a second digital image is established which is intended to be printed at a second location on the second side of the roll. The second location is located at the backside of the first location.

In a fifth step T5 the first entry of the first digital image in the digital image queue is linked to the second entry of the second digital image in the digital image queue by means of a linking digital item in the digital image queue.

The method proceeds to intermediate point B in FIG. 15 which corresponds to intermediate point B in FIG. 16. Intermediate point B in FIG. 16 leads to a sixth step T6.

In the sixth step T6 it is checked whether or not the roll-to-roll printing system is ready to print on the roll. This may be the case if printing on the rolls scheduled before said roll has been completed or the user has pressed a print button (not shown) on the user interface screen. If so, the method proceeds to intermediate point C. If not so, the method proceeds to a seventh step T7.

In the seventh step T7 it is checked whether or not a position of the first linked entry in the digital image queue is changed into a new first position. If so, the method proceeds to an eighth step T8. If not so, the method proceeds to a ninth step T9.

In the eighth step T8 a position of the second linked entry in the digital image queue is changed such that the digital image corresponding to the second linked entry at the changed position is intended to be printed on the backside of the digital image corresponding to the first linked entry at the new first position.

In the ninth step T9 it is checked whether or not a position of the second linked entry in the digital image queue is changed into a new second position. If so, the method proceeds to a tenth step T10. If not so, the method proceeds to the sixth step T6.

In the tenth step T10 a position of the first linked entry in the digital image queue is changed such that the digital image corresponding to the first linked entry at the changed position is intended to be printed on the backside of the digital image corresponding to the second linked entry at the new second position. Then the method returns to the sixth step T6.

The intermediate point C in FIG. 16 corresponds to intermediate point C in FIG. 17. Intermediate point C in FIG. 17 leads to an eleventh step T11.

In the eleventh step T11 the first digital images are printed on the first side of the roll according to the digital image queue. When the first side of the roll has been completely printed, the one-sided printed roll is removed from the output holder.

In a twelfth step T12 the one-sided printed roll is received in the input holder.

In a thirteenth step T13 the second digital images are printed on the second side of the roll according to the corresponding linking digital items in the digital image queue.

The method ends in end point D.

The flow diagrams in FIGS. 15-17 are merely exemplary. Combinations of the flow diagram in FIGS. 15-17 with other embodiments of the method according to the invention may be envisioned, even provided with additional steps according to the embodiments of the digital image queue as shown in FIG. 2, 6, 9 and the user interface screens as shown in FIG. 3-5, 7, 8, 10-14.

In another embodiment the method for two-sided printing of digital images on a roll of media by means of a roll-to-roll system is slightly different from the embodiments mentioned here-above. The roll comprises two webs of media to be printed upon. After printing on the two webs of media the two webs of media are attached to each other and form a composed two-sided printed roll.

On a first web—in fact a first input roll—the digital images corresponding to first entries in the digital image queue are printed.

On a second web—in fact a second input roll—the digital images corresponding to second entries in the digital image queue are printed. The first entries and the second entries are linked according to the invention. The step of receiving the one-sided printed roll in the input holder as according to the previous embodiments is replaced by receiving the second web—the second input roll—in the input holder.

With respect to this embodiment the roll-to-roll system comprises a digital image queue comprising entries for digital images to be printed on the first input roll. The method comprises the steps of for each digital image to be printed on the first input roll, being a first side of the composed roll, registering a first entry in the digital image queue which entry comprises at least one digital item identifying the digital image and digital items of print properties of the digital image, for each digital image to be printed on the second input roll, being a second side of the composed roll, registering a second entry in the digital image queue which entry comprises at least one digital item identifying the digital image and digital items of print properties of the digital image, printing the first digital images on the first side of the composed roll, i.e. on the first input roll, according to the digital image queue, receiving the second input roll in the input holder, and printing the second digital images on the second side of the composed roll, i.e. on the second input roll, for each first digital image to be printed on the first side of the composed roll, establishing a first location on the first side of the composed roll at which first location the first digital image is intended to be printed, establishing a second digital image which is intended to be printed at a second location on the second side of the composed roll, the second location being the backside of the first location, and linking the first entry of the first digital image in the digital image queue to the second entry of the second digital image in the digital image queue by means of a linking digital item in the digital image queue, and printing the second digital images on the second side of the composed roll according to the corresponding linking digital items in the digital image queue.

Upon changing a position of the first linked entry in the digital image queue into a new first position, changing a position of the second linked entry in the digital image queue such that the digital image corresponding to the second linked entry at the changed position is intended to be printed on the backside of the digital image corresponding to the first linked entry at the new first position.

Upon changing a position of the second linked entry in the digital image queue into a new second position, changing a position of the first linked entry in the digital image queue such that the digital image corresponding to the first linked entry at the changed position is intended to be printed on the backside of the digital image corresponding to the second linked entry at the new second position.

An additional step may be to finish the two printed input rolls in order to establish the composed roll. This may be for example a finishing step like gluing, binding, etc.

This embodiment is useful when rolls of media are available which have a different media property for one side of the roll than for the other side of the roll. For example, a one-sided coated media is used or a media having a rough side and a smooth side is used. In case of a one-sided coated media roll, the linked digital images may be printed on the coated sides of the rolls. By doing so, the image quality of the printed digital images on the composed roll is overall the same, i.e. the image quality of the printed digital images on the coated side of the first roll are approximately equal to the image quality of the printed digital images on the coated side of the second roll.

This embodiment is also useful when two printed rolls have to be positioned along each other in the length direction of the unwound rolls. In this particular case, the linking step may be different than mentioned before, since the digital image firstly printed on the first roll has to be linked to the digital image firstly printed on the second roll etc., instead of linking the digital image firstly printed on the first roll to the digital image last printed on the second roll, etc.

The above disclosure is intended as merely exemplary, and not to limit the scope of the invention, which is to be determined by reference to the following claims.

The invention claimed is:

1. A method for two-sided printing of digital images on a roll of media by means of a roll-to-roll system, the roll-to-roll system comprising a digital image queue comprising entries for digital images to be printed on the roll, the method comprising the steps of:

for each digital image to be printed on a first side of the roll, registering a first entry in the digital image queue, which entry comprises at least one digital item identifying the digital image and digital items of print properties of the digital image;

for each digital image to be printed on a second side, opposite to the first side, of the roll, registering a second entry in the digital image queue, which entry comprises at least one digital item identifying the digital image and digital items of print properties of the digital image;

for each first digital image to be printed on the first side of the roll:

establishing a first location on the first side of the roll at which first location the first digital image is intended to be printed;

establishing a second digital image which is intended to be printed at a second location on the second side of the roll, the second location being the backside of the first location; and linking the first entry of the first digital image in the digital image queue to the second entry of the second digital image in the digital image queue by means of a linking digital item in the digital image queue;

printing the first digital images on the first side of the roll according to the digital image queue;

receiving the one-sided printed roll in the input holder;

printing the second digital images on the second side of the roll according to the corresponding linking digital items in the digital image queue;

upon changing a position of the first linked entry in the digital image queue into a new first position, changing a position of the second linked entry in the digital image queue; printing the first digital images on the first side of the roll according to the new first position and printing the second digital images on the second side of the roll according to the changed position of the second linked entry which is corresponding to the new first position of the first linked entry; and upon changing a position of the second linked entry in the digital image queue into a new second position, changing a position of the first linked entry in the digital image queue; printing the first digital images on the first side of the roll according to the changed position and printing the second digital images on the second side of the roll according to the new second position of the second linked entry, the changed position of the first linked entry being corresponding to the new second position of the second linked entry.

2. The method according to claim 1, wherein the method comprises a step of, upon changing a value of a digital item of a print property of the first linked entry into a new first value, changing a value of a corresponding digital item of a print property of the second linked entry into the same new first value.

3. The method according to claim 2, wherein the print property is at least one out of a number of copies, a left margin to be taken into account when printing on the roll, a right margin to be taken into account when printing on the roll, a top margin to be taken into account when printing on the roll, and a bottom margin to be taken into account when printing on the roll.

4. The method according to claim 1, wherein the method comprises the step of, upon changing a value of a digital item of a print property of the second linked entry into a new second value, changing a value of a corresponding digital item of a print property of the first linked entry into the same new second value.

5. The method according to claim 1, wherein the step of printing the second digital images on the second side of the roll according to the corresponding linking digital items in the digital image queue comprises the step of centering the second digital images on the second side of the roll to the center of the printed corresponding first digital images on the first side of the roll.

6. The method according to claim 1, wherein the step of changing a position of the first linked entry into another position in the digital image queue comprises the sub-steps of:

displaying a user operable representation of the digital image queue on a user interface screen of the roll-to-roll printing system, the user operable representation having a digital image part for an entry of a digital image intended to be printed on the roll;

moving the digital image part corresponding with the first linked entry to a position in the user interface screen corresponding to the other position; and automatically moving the digital image part corresponding with the second linked entry to a corresponding position in the user interface screen.

7. The method according to claim 6, wherein the step of linking the first entry of the first digital image in the digital image queue to the second entry of the second digital image in the digital image queue, comprises the step of making a digital image part of the user operable representation of the digital image queue on a user interface screen of the roll-to-roll printing system inoperable for a user, the digital image part corresponding to the second entry in the digital image queue.

8. The method according to claim 6, wherein the method comprises the step of, after printing the first digital image of the first entry in the digital image queue which first entry is linked to the second entry of the second digital image in the digital image queue, making a digital image part of the user operable representation of the digital image queue on a user interface screen of the roll-to-roll printing system inoperable for a user, the digital image part corresponding to the second entry in the digital image queue.

9. The method according to claim 6, wherein the method comprises the steps of changing a roll property of the roll by means of the user interface screen and changing the corresponding digital items of print properties of the linked entries corresponding to digital images to be printed on the both sides of the roll.

10. The method according to claim 1, wherein the step of changing a position of the second linked entry into another position in the digital image queue comprises the sub-steps of:

displaying a user operable representation of the digital image queue on a user interface of the roll-to-roll printing system, the user operable representation having a digital image part for an entry of a digital image intended to be printed on the roll;

moving the digital image part corresponding with the second linked entry to a position in the user interface screen corresponding to the other position; and automatically moving the digital image part corresponding with the first linked entry to a corresponding position in the user interface screen.

11. A roll-to-roll printing system for two-sided printing of digital images on a roll of media, the roll-to-roll printing system comprising at least one input holder for holding a roll of media;
at least one output holder for holding the printed roll;

a control unit comprising a digital image queue comprising an entry for each digital image to be printed on a first side of the roll and comprising an entry for each digital image to be printed on the second side of the roll, each entry comprising a first digital item identifying the digital image and digital items of print properties of the digital image;

a user interface for displaying and manipulating an entry of the digital image queue; and a print section for printing digital images on both sides of media of the roll according to the digital image queue, wherein the control unit comprises:

a first establishing section for establishing a first location on the first side of the roll at which first location the first digital image is intended to be printed;

a second establishing section for establishing a second digital image which is intended to be printed at a second location on the second side of the roll, the second location being the backside of the first location; and a linking section for linking the first entry of the first digital image in the digital image queue to the second entry of the second digital image in the digital image queue by means of a linking digital item in the digital image queue, and wherein the control unit is configured to execute the method according to claim 1.

12. The roll-to-roll printing system according to claim 11, wherein the linking section is configured to make, after linking the first entry in the digital image queue to the second entry in the digital image queue, a digital image part of the user operable representation of the digital image queue on a user interface screen of the roll-to-roll printing system inoperable for a user, the digital image part corresponding to the second entry in the digital image queue.

13. The roll-to-roll printing system according to claim 11, wherein the control unit is configured to make, after printing the first digital image of the first entry in the digital image queue which first entry is linked to the second entry of the second digital image in the digital image queue, a digital image part of the user operable representation of the digital image queue on a user interface screen of the roll-to-roll printing system inoperable for a user, the digital image part corresponding to the second entry in the digital image queue.

14. A non-transitory recording medium comprising computer executable program code configured to instruct a computer to perform the method according to claim 1.

* * * * *